United States Patent [19]

Ealer

[11] Patent Number: 5,258,161
[45] Date of Patent: Nov. 2, 1993

[54] BLOWN FILM EXTRUSION

[75] Inventor: George E. Ealer, Whitehouse Station, N.J.

[73] Assignee: Union Carbide Chemicals & Plastics Technology Corporation, Danbury, Conn.

[21] Appl. No.: 898,706

[22] Filed: Jun. 15, 1992

[51] Int. Cl.$^5$ ............................................. B29C 47/90
[52] U.S. Cl. .................... 264/566; 264/569; 264/211.21; 425/72.1; 425/326.1
[58] Field of Search ............... 264/564–566, 264/567, 569, 211.21; 425/72.1, 326.1

[56] References Cited

U.S. PATENT DOCUMENTS

| 4,511,530 | 4/1985 | Olsson et al. | 425/72.1 |
| 4,606,879 | 8/1986 | Cerisano | 425/326.1 |
| 4,632,801 | 12/1986 | Dowd | 425/72.1 |
| 4,818,467 | 4/1989 | Audureau et al. | 425/326.1 |
| 4,820,471 | 4/1989 | van der Molen | 264/564 |
| 4,832,897 | 5/1989 | van der Molen | 264/564 |
| 4,842,803 | 6/1989 | Bose et al. | 425/326.1 |
| 4,938,903 | 7/1990 | Schaeffer et al. | 425/326.1 |
| 4,976,898 | 12/1990 | Lustig et al. | 264/567 |
| 4,988,465 | 1/1991 | Lustig et al. | 264/567 |

FOREIGN PATENT DOCUMENTS 0374783 6/1990 European Pat. Off. .

*Primary Examiner*—Jeffery Thurlow
*Attorney, Agent, or Firm*—C. J. Vicari

[57] ABSTRACT

A method for producing film having high tensile impact and dart drop properties by introducing a very low density ethylene alpha olefin copolymer having a melt index of less than 0.1 gm/10 min. a melt flow ratio of about 14–18 and a dispersity greater than 10 into a stalk extrusion apparatus and thereafter forming a film from said resin.

10 Claims, No Drawings

BLOWN FILM EXTRUSION

FIELD OF THE INVENTION

This invention relates to a method for producing films having high tensile impact and dart drop properties.

DESCRIPTION OF THE PRIOR ART

Production of polyolefin film by blown film extrusion is well known. In a typical blown film extrusion process, polyolefin resin is melted in a screw extruder wherein pressure is developed on the molten resin, causing the molten resin to pass through a die having a circular orifice to form a tubular film or sleeve, also known as a "bubble".

Gas, usually air, is provided to the interior of the bubble to inflate it to a desired diameter. The gas is contained within the bubble by the die and by a pair of nip rolls disposed downstream from the die. The nip rolls provide the force to pull the bubble away from the die in a machine direction ("MD") at a desired speed.

The rate of extrusion of the melt, the rate of speed of the nip rolls, and the degree of inflation of the bubble together determine the final thickness of the film.

Between the die and the nip rolls, the melt cools, and undergoes a phase change to the crystalline state. A so-called "frost line" is observable at the point of the bubble at which the phase change occurs.

Conventional blown film extrusion can be generally classified as either a "stalk" extrusion or a "pocket" extrusion.

In stalk extrusion, an air ring, usually a single lip air ring, is disposed adjacent the die and provides stabilizing air flow generally parallel to the machine direction. Thus, the bubble maintains a relatively uniform diameter approximately equal to that of the annular die for a significant distance from the die, and eventually expands in the transverse direction ("TD") to the desired diameter due to the gas pressure within the bubble.

In pocket extrusion, a force is applied by an air ring disposed adjacent the die to cause the bubble leaving the die to immediately expand in the transverse direction at a rate dependent on the design of the air ring. This type of rapid expansion can be achieved with a so-called "dual lip" air ring designed to create a vacuum to pull the bubble in the transverse direction. Techniques for producing film by the "pocket" extrusion method can be found in a variety of published literature such as U.S. Pat, Nos. 4,243,619 and 4,294,746.

When forming film from high pressure-low density polyethylene (HP-LDPE) or linear low density polyethylene (LLDPE), made by the gas phase process it has been the custom to produce the films from "pocket" extrusion techniques. Unfortunately, however, when forming film by pocket extrusion techniques from high molecular weight i.e., 130,000 Mw very low density polyethylene resins, e.g., below 0.915 g/cc density, such as contemplated by the present invention, the tendency to orient in one direction makes it difficult to obtain very high dart drop impact numbers for the produced film. This is understandable since it is well known in the art that in general, stalk extrusion techniques are not suitable for certain types of resin such as "linear low density polyethylene" which do not have sufficiently high viscosities and melt strength necessary for the formation of a long stalk (see, for example, U.S. Pat. No. 4,632,801 issued Dec. 30, 1986, particularly column 4, lines 63–68.

Notwithstanding this popularly held belief, when the resins of the present invention were processed into film using the stalk mode technique, the resulting films were found to exhibit extremely outstanding tensile impact and dart drop characteristics compared to that obtained with an even higher blow-up-ratio (BUR) in the standard LLDPE mode of pocket extrusion.

STATEMENT OF THE INVENTION

Broadly contemplated the present invention provides a method for producing film having high tensile impact and dart drop which comprises:

(a) providing a resin containing about 75% to about 90% ethylene and about 10% to about 25% of at least one alpha olefin containing from 2 to 8 carbon atoms; said resin having a density of about 0.86 to about 0.910 g/cc, a melt index of less than 0.1 gm/10 min, a melt flow ratio of about 14–18 and a dispersity greater than 10, (b) introducing said resin into a stalk extrusion apparatus including an extrusion die having a die gap of 25 to 45 mil preferably 30–40 mil;

(c) extruding said resin in said high stalk extrusion apparatus to form a stalk of from 7 to 10 die diameters and at a blowup ratio of from 3:1 to about 4:1; to form a film from said resin.

DETAILED DESCRIPTION OF THE INVENTION

The ethylene-alpha-olefin copolymers which can be used in the present invention are copolymers containing at least about 75% ethylene, preferably about 75% to about 90% ethylene, and at least one alpha-olefin having 3–12 carbon atoms. The alpha-olefin selected can be linear or branched and can be propylene, butene-1, pentene-1, 4-methyl hexene-1, 4,4-dimethyl pentene-1 and like alpha-olefins. The preferred copolymers are ethylene-butene copolymers having an ethylene content of about 75% to 90% by weight based on the weight of the copolymer, a density of about 0.88 g/cc to about 0.910 g/cc and a melt index of about 0.05 gm/10 min to about 0.1 gm/10 min as determined by ASTM D-1238 condition E. A particularly suitable copolymer is available from Union Carbide Corporation under the designation RTS 1015 NT7.

The ethylene-alpha-olefin copolymer can be produced in the vapor phase using the so-called Ziegler catalyst produced by combining a transition metal compound of a metal in the Group IV to the Group VIII category of the periodic table and an organometallic compound of a metal in the Group I to Group III category. The ethylene-alpha-olefin copolymer can be produced at lower temperatures and under lower pressures compared with conventional high-pressure polyethylene.

More specifically, the linear ethylene-alpha-olefin copolymer used in this invention can be produced by the process for continuously producing ethylene copolymers as disclosed in U.S. Pat. Nos. 4,302,565 and 4,508,842.

The resins contemplated for use in the present invention are further characterized as those ethylene copolymer resins having a density of about 0.88 to about 0.910 g/cm$^3$.

These resins are commonly termed very low density polyethylenes (VLDPE). Various VLDPE's are manufactured by Union Carbide Corporation of Danbury, Conn., U.S.A. by the fluidized bed process known as the UNIPOL (trademark of Union Carbide Corporation) process.

The resins of the present invention can be processed with the aid of conventional slip and antiblock agents. Conventional slip agents which can be employed include for example oleamide and erucamide. Conventional antiblock agents which can be employed include talc, silica and calcium carbonate. The slip and antiblock agents can be employed in amounts of about 0% to 3.15% based on the weight of the resin preferably about 0.5 to about 0.15% for the slip agents and about 0.05% to about 3% of antiblock preferably about 1 to 2%.

Conventional high stalk extrusion apparatus can also be employed.

The fabrication parameters used include an extruder specifically designed to process resins of high molecular weight at controlled temperatures. It is preferred however to use a grooved barrel extruder which is available from a variety of commerical sources.

Particularly suitable extruders are the high density extruders which are extruders specifically designed to extrude higher molecular weight HDPE's using a bubble type configuration. Conventional extruders of this type are available from Alpine Corp. as is known in the art. These extruders have (1) a grooved barrel in the feed section; (2) a screw design which has little or preferably no compression but which relies on the grooved barrel section to shear and melt the resin so rapidly as to avoid molecular degradation; (3) an L/D (length to barrel ratio) of at least 20:1 to 30:1. Those skilled in the art are well aware of these distinctions and why they are necessary. In addition a conventional die used for stalk extrusion can be utilized which provides extrusion from a die gap of about 25 to 45 mil preferably 30 to 40 mil. A high stalk configuration known to those in the art of from about 7 to about 10 die diameters was utilized, and a blowup ratio (BUR) equal to the bubble diameter divided by the die diameter of from about 3:1 to about 4:1 was utilized. The preferable practice is to utilize a 3.5:1 BUR, a 40 mil die gap and about 9-10 die diameter stalk height.

The following example and comparative example is given to illustrate the present invention.

Unless otherwise noted, the physical properties reported in the examples below were measured by the following test procedures.

| | |
|---|---|
| Tensile Strength | ASTM D-882, Method A |
| Percent Elongation | ASTM D-882, Method A |
| Secant Modulus | ASTM D-882, Method A |
| Dart drop | ASTM 1709 |
| Yield Strength | ASTM D-882 |
| Tensile Impact Strength | The tensile impact strength method identified as Union Carbide Corporation Method No. WC-69-A which is a standard testing method of UCC. |

EXAMPLE 1

Blown film was prepared under conditions as shown in Table I. The used polymer composition was an ethylene-butene copolymer available from UCC under the designation RTS 1015 NT7. The copolymer contained about 90% by weight ethylene and 10% by weight butene. The copolymer had a density of 0.904 g/cc, a flow index of 7.57 gm/10 min as determined by ASTM procedure D-1238 condition F; and a dispersity of 10. The equipment utilized was an alpine 60 mm grooved barrel extruder; a 3" conventional high density polyethylene die having a 40 mil die gap, a conventional single lip high density air ring and a collapsing frame which had Kraft paper placed in the frame.

The extrusion settings and other characteristics are indicated in Table I.

TABLE I

| Extruder Settings: | |
|---|---|
| Zone 1 | 400° F. |
| Zone 2 | 400° F. |
| Zone 3 | 400° F. |
| Zone 4 | 400° F. |
| Zone 5 | 400° F. |
| Zone 6 | 400° F. |
| Zone 7 | 400° F. |
| Zone 8 | 400° F. |
| Compound Temperature | 425° F. |
| Screw RPM | 69 |
| Screw Amps | 66.7 |
| Pressure | 5200 |
| Rate (lbs/hr) | 80 |
| Frostline Height (inches) | 30 |
| Wind-up-FPM | 74.9 |
| Ave. Gauge (mils) | 1.5 |
| BUR | 3:1 |
| Internal Bubble Pressure | 1.3" water |

The film produced in Example 1 was subjected to various tests to determine the films physical properties. The results are indicated in Table 2.

TABLE 2

High Stalk VLDPE Extrusion Film Physical Properties

| | Tensile Strength (psi) |
|---|---|
| MD | 6550 |
| TD | 5830 |
| | Elongation % |
| MD | 368 |
| TD | 524 |
| | Yield Strength (psi) |
| MD | 0 |
| TD | 0 (no yield) |
| | Secant Modulus (psi) |
| MD | 14,900 |
| TD | 15,900 |
| | Tensile Impact Strength (ft-lb/in$^3$) |
| MD | 1832 |
| TD | 2631 |
| | Dart Drop |
| Procedure B (gms) | 1445 |
| (gms/mil) | >963 |

EXAMPLE 2

The same composition as in Example 1 was made into film by the pocket extrusion technique. The equipment utilized was an 1½ Sterling extruder having a 24:1 L/D screw and a smooth barrel. The die was a conventional 3" die having a 30 mil die gap. The extrusion setting and other characteristics are indicated in Table 3.

TABLE 3

| | |
|---|---|
| Zone 1 °F. | 400 |
| Zone 2 °F. | 400 |
| Zone 3 °F. | 400 |
| Zone 4 °F. | 400 |
| Adapter °F. | 420 |
| Die Body °F. | 420 |

TABLE 3-continued

| | |
|---|---|
| Top °F. | 420 |
| Head Pressure (psi) | 4700 |
| Melt Temperature °F. | 450 |
| Drive (amps) | 15.25 |
| Screw (Rpm) | 110 |
| Rates (lbs/hr) | 42 |
| Line Speed (fpm) | 47 |
| BUR | 3.3:1 |
| Frostline height | 9.0 |

The film produced in Example 2 was then subjected to various tests to determine the film physical properties. The results are indicated in Table 4.

TABLE 4

| Pocket Mode Extrusion Physical Properties | | |
|---|---|---|
| BUR | | 3.3:1 |
| Tensile Strength (psi) | MD | 6821 |
| | TD | 6492 |
| Elongation (%) | MD | 498 |
| | TD | 750 |
| Yield Strength (psi) | MD | 0 |
| | TD | 0 |
| Secant Modulus (psi) | MD | 15,000 |
| | TD | 17,200 |
| Tensile Impact Strength | MD | 1680 |
| (ft-lb/in$^3$) | TD | 1822 |
| Dart Drop | | |
| Procedure B (gm) | | 891 |
| (gm/mil) | | 594 |

As will be determined from a comparison of Table 2 to Table 4, the data already shows that the high stalk configuration of extrusion produces the best toughness as measured by tensile impact and dart drop.

Although described with reference to preferred embodiments it is to be understood that modifications and variations to the herein disclosed invention may be resorted to without departing from the spirit thereof, as those skilled in the art will readily understand. Such variations and modifications are considered to be within the purview and scope of the appended claims.

I claim:

1. A method for producing film having high tensile impact and dart drop which comprises:
   (a) providing a resin containing about 75% to about 90% ethylene and about 10% to about 25% of at least one alpha olefin containing from 2 to 8 carbon atoms; said resin having a density of about 0.86 to about 0.910 g/cc, a melt index of less than 0.1 gm/10 min, a melt flow ratio of about 14–18 and a dispersity greater than 10,
   (b) introducing said resin into a stalk extrusion apparatus including an extrusion die having a die gap of about 25 to 45 mil.;
   (c) extruding said resin in said stalk extrusion apparatus to form a stalk of from 7 to 10 die diameters and at a blowup ratio of from 3:1 to about 4:1; to form a film from said resin.

2. A method according to claim 1 wherein in step (a) said resin contains about 0.5 to about 0.15% based on the weight of said resin of a slip agent.

3. A method according to claim 2 wherein said slip agent is oleamide or erucamide.

4. A method according to claim 1 wherein in step (a) said resin contains about 0.05% to about 3% based on the weight of said resin of an antiblock agent.

5. A method according to claim 4 wherein said antiblock agent is talc or silica or calcium carbonate.

6. A method according to claim 1 wherein in step (a) said resin is an ethylene-butene copolymer having a density of about 0.88% g/cc to about 0.910 g/cc and a melt index of about 0.05 gm/10 min. to about 0.1 gm/10 min.

7. A method according to claim 1 wherein in step (b) said extrusion die has a die gap of about 30 to about 40 mil.

8. A method according to claim 1 wherein in step (c) said resin is extruded to form a stalk of from 9 to 10 diameter stalk height at a blow-up ratio of 3.5:1.

9. A method for producing film having high tensile impact and dart drop which comprises:
   (a) providing an ethylene-butene copolymer resin containing about 75% to about 90% ethylene said resin having a density of about 0.88 to about 0.910 g/cc, a melt index of about 0.05 gm/10 min to about 0.1 gm/10 min, a melt flow ratio of about 14–18 and a dispersity greater than 10,
   (b) introducing said resin into a stalk extrusion apparatus including an extrusion die having a die gap of about 30 to 40 mil.;
   (c) extruding said resin in said stalk extrusion apparatus to form a stalk of from 9 to 10 die diameters and at a blowup ratio of from 3.5:1; to form a film from said resin.

10. A method according to claim 9 wherein in step (a) said resin contains about 0.5 to about 0.15% by weight of a slip agent and about 0.05% to about 3% by weight of an antiblock agent.

* * * * *